July 16, 1963
R. B. BARRIE
3,097,372
AMPHIBIOUS VEHICLE
Filed April 17, 1961
3 Sheets-Sheet 1
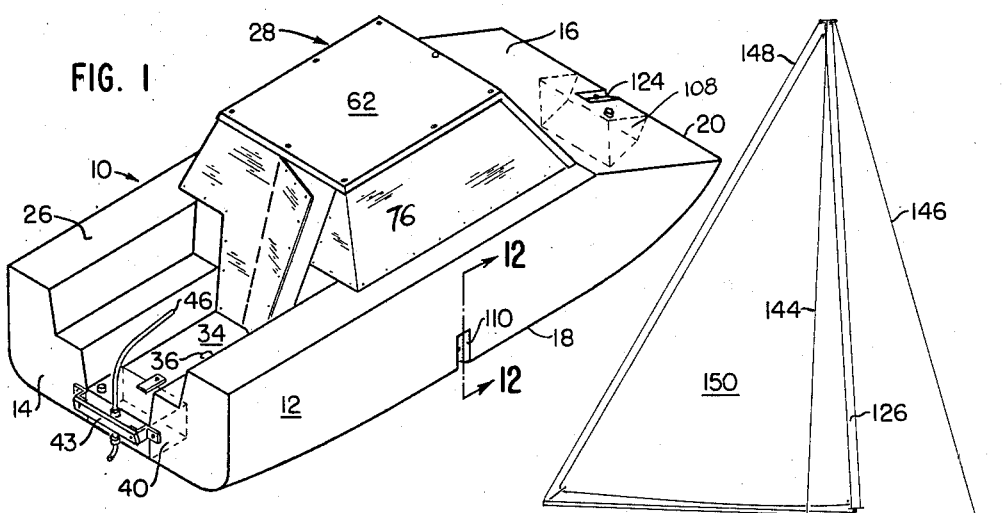
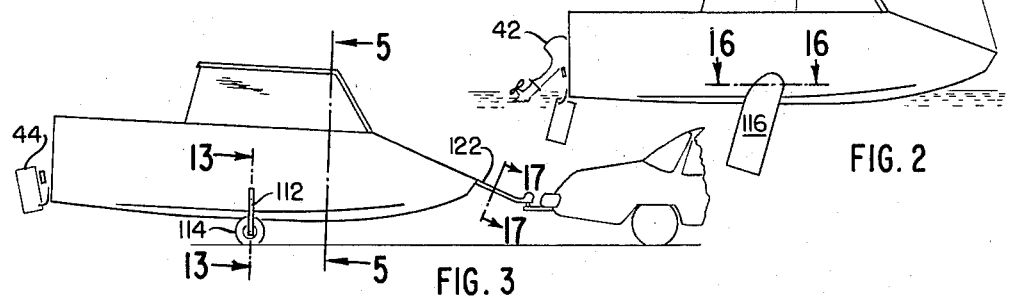
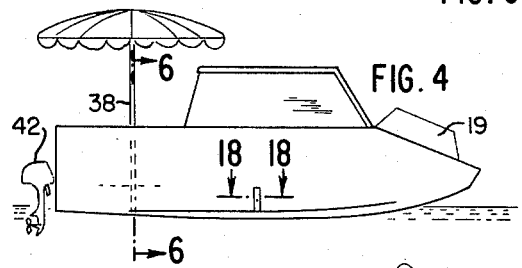
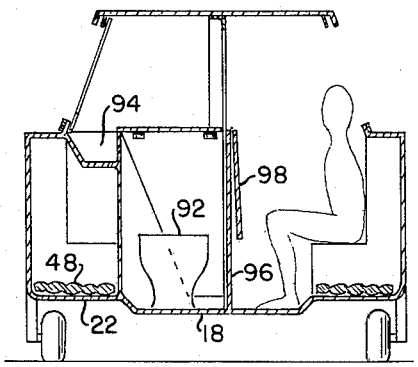
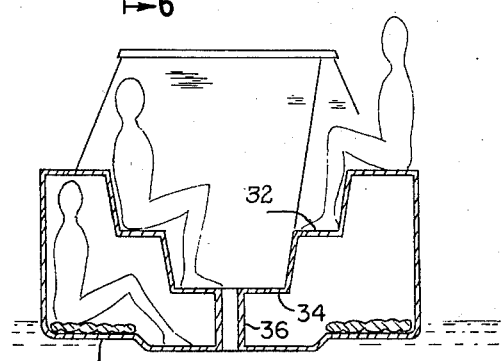
*INVENTOR.*
ROBERT B. BARRIE

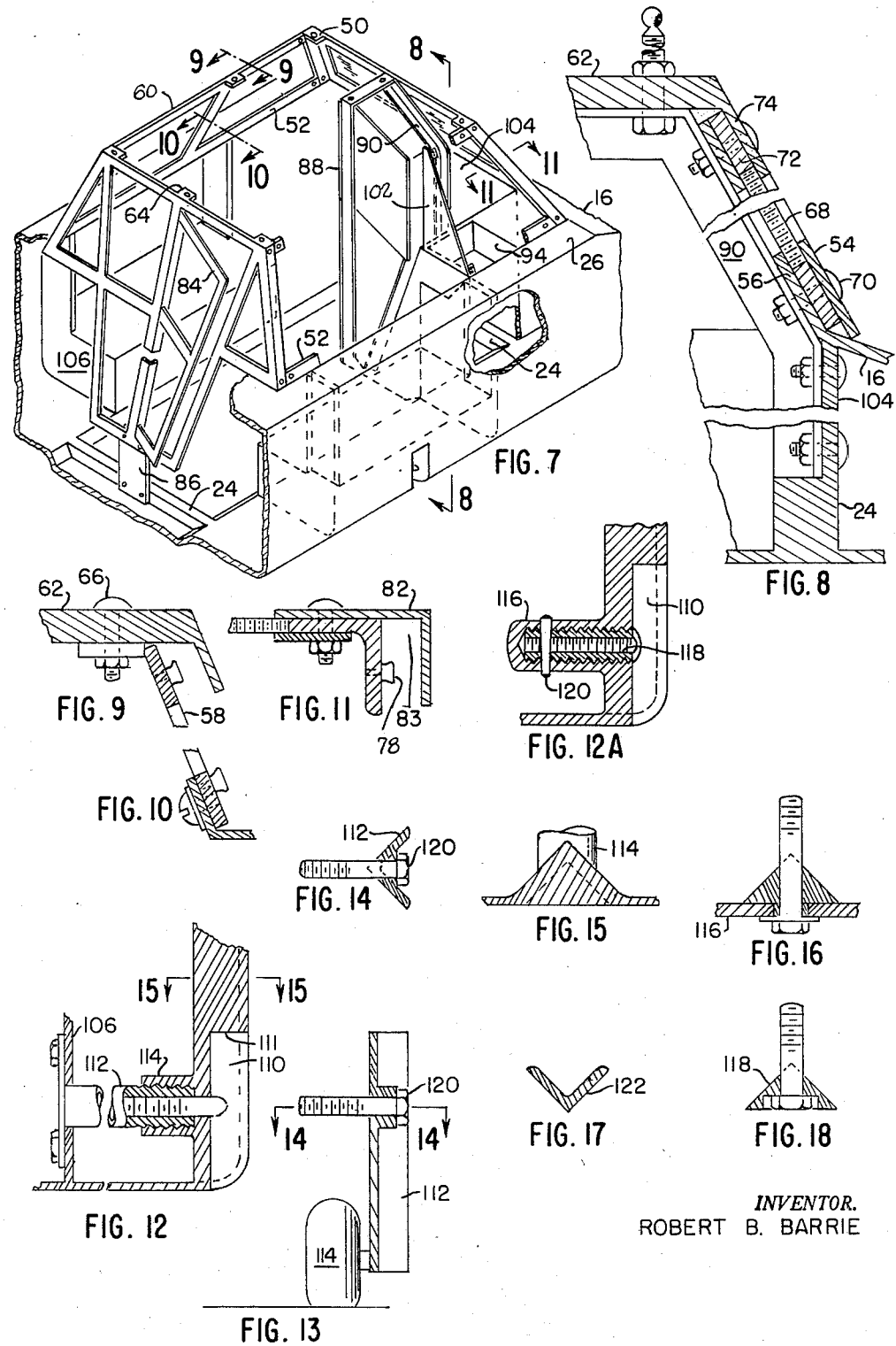

July 16, 1963  R. B. BARRIE  3,097,372
AMPHIBIOUS VEHICLE
Filed April 17, 1961  3 Sheets-Sheet 3

INVENTOR.
ROBERT B. BARRIE

United States Patent Office 3,097,372
Patented July 16, 1963

3,097,372
AMPHIBIOUS VEHICLE
Robert B. Barrie, Neds Point Road, Mattapoisett, Mass.
Filed Apr. 17, 1961, Ser. No. 103,302
4 Claims. (Cl. 9—1)

This invention relates to amphibious vehicles and more particularly comprises a novel and highly versatile combination travel trailer and auxiliary sailboat.

Although combination boats and trailers have been heretofore available, none of them has proven to be particularly satisfactory from the standpoint of all around utility, convenience and initial cost.

It is an object therefore of the present invention to provide an amphibious vehicle of improved design, whereby the craft may be quickly and easily converted from an auxiliary sailboat to a travel trailer.

Yet another object of this invention is to provide an auxiliary sailboat equipped with novel means for setting, reefing and storing a sail.

Still another object of this invention is to provide a simple but unique arrangement for detachably mounting wheels to the hull of the craft when it is to be used on land or, alternatively, for mounting leeboards for use in water.

More particularly this invention features an amphibious craft provided with a mast that is rotatable about its longitudinal axis whereby a sail attached to the mast may be readily and conveniently set, furled or reefed by rotation of the mast.

As another feature of this invention the port and starboard sides of the hull are provided each with an outwardly facing vertical channel member to support the struts of wheels so that the craft may be towed along the road without need of a separate trailer. Alternatively these channel members may serve to support leeboards when the craft is water borne and under sail. The craft may also be driven by an outboard motor to further enhance its versatility.

Still another feature of this invention relates to a skeletal frame which forms a cabin for the craft and at the same time supports the weight of the mast while adding structural rigidity to the hull. In order to keep the cost as low as possible, a unique and integrated design has been adopted to permit the use of stock materials throughout a large portion of the craft.

These and other features of the invention, along with further objects and advantages thereof will become more fully apparent from the following detailed description taken in connection with the accompanying drawings in which:

FIG. 1 is a view in perspective showing the hull of the vessel,

FIG. 2 is a view in side elevation of the craft in use as an auxiliary sailboat, FIG. 3 is similar to FIG. 2 but showing the craft in use as a trailer, FIG. 4 is a side elevation of the craft arranged for propulsion by an outboard motor, FIG. 5 is a view in cross section taken along the line 5—5 of FIG. 3, FIG. 6 is a cross-sectional view taken along the line 6—6 of FIG. 4, FIG. 7 is a perspective view of the cabin section with parts broken away to show details of construction, FIG. 8 is a cross section taken along line 8—8 of FIG. 7, FIG. 9 is a cross-sectional view taken along the line 9—9 of FIG. 7, FIG. 10 is a cross-sectional view taken along the line 10—10 of FIG. 7, FIG. 11 is a cross section taken along the line 11—11 of FIG. 7, FIG. 12 is a cross section taken along the line 12—12 of FIG. 1, FIG. 12a is a view similar to FIG. 12 but showing a modification of construction, FIG. 13 is a cross section taken along the line 13—13 of FIG. 3, FIG. 14 is a cross section taken along the line 14—14 of FIG. 13, FIG. 15 is a cross section taken along the line 15—15 of FIG. 12, FIG. 16 is a cross section taken along the line 16—16 of FIG. 2, FIG. 17 is a cross section taken along the line 17—17 of FIG. 3.

FIG. 18 is a cross section taken along the line 18—18 of FIG. 4,

Figure 19:
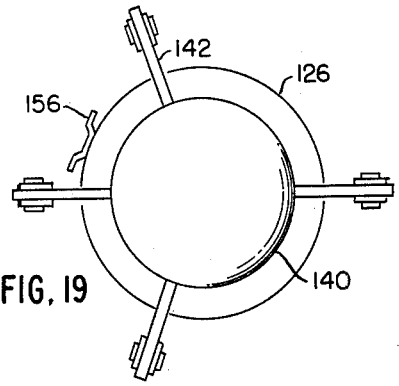
FIG. 19 is a top plan view of the masthead.

Referring now to the drawings, the reference character 10 indicates a hull preferably fabricated from fiberglass, although plywood, aluminum or other material or a combination of any of them may be used to good advantage. The hull 10 is substantially rectangular in plan view having parallel flat vertical sides 12 and a flat vertical stern 14. A flat, downwardly sloping foredeck 16 merges with the turned up forward edge of a generally flat bottom 18 to form a horizontal bow edge 20. The foredeck may be used to store a tender 19 arranged thwartships as suggested in FIG. 4.

The craft has no keel as such, deriving structural rigidity and lateral stability by means of longitudinal steps 22 formed along the hull bottom 18 with several transverse ribs 24 extending between the steps as shown best in FIG. 7. A narrow deck 26 extends along either side of the hull between the rear edge of the foredeck 16 and the stern 14 and outboard of a closed cabin 28 and self-bailing after cockpit. The cockpit is provided with a pair of longitudinal bench seats 32 accommodating several passengers in two-level seating (FIG. 6). A floor 34 for the cockpit is spaced from the hull bottom 18 and supported by a tubular member 36 which functions also as a drain for the cockpit and as a support for the lower end of an umbrella 38 as shown in FIG. 4.

Fitted flush with the floor 34 and between the seats 32 is a fuel tank 40 for an outboard motor 42 which may be mounted on a bracket 43 secured to the stern. A conventional rudder 44 and tiller 46 are provided with the rudder adapted to swing up and out of the way when not in use.

Referring to FIGS. 5 and 6 it will be observed that there is sufficient head room provided between the outer hull and the seats to permit passengers to sit upright on the steps 22. Mattresses 48 may be laid along the steps 22 on either side of the craft, both fore and aft to offer sleeping accommodations for four adults.

The cabin itself is enclosed principally within a skeletal frame structure 50 which substantially adds to the strength of the hull and also serves as a supporting base for a mast. The structure includes horizontal side frame members 52 which are bolted to the inboard edge of the deck 26 and a transverse member 54 secured to an upwardly turned lip 56 formed along the after edge of the foredeck 16. A series of inclined braces 58 support an upper rectangular frame 60 which carries a roof panel 62 of sheet plywood or reinforced fiberglass construction. A number of perforated tabs 64 are spaced about the frame 60 through which securing means such as bolts 66 may pass. The entire frame, being bolted together, may be conveniently disassembled for storage and shipping purposes.

A transparent glass windshield 68 is mounted across the inclined front of the frame 50, and held by bolts 70 engaged to the hull and frame members with suitable spacing elements 72 arranged about the margin of the windshield. It will be observed in FIG. 8 that the roof 62 is formed with a downwardly inclined flange 74 and it will also be noted that the top edge of the windshield is mounted under this flange while the lower edge is fastened over the lip 56. This overlapping assembly affords maximum protection against water seepage into the forward end of the cabin. The side and after sections may be covered by transparent inserts 76 of flexible plastic material such as that sold under the trade name "Mylar." The inserts may be detachably secured to the cabin frame by means of a series of snap-type fastening devices 78 which hold the inserts snugly in place. For protection against water, the inserts are mounted in a manner similar to that of the windshield 68, that is to say, the upper edge is secured under the flange 74 with the lower edge overlying an upwardly inclined flange 80 formed along the inboard edge of the deck 26. To seal the cabin at the junction of the forward corner posts and the inserts, a length of angle stock 82 is applied to the corner posts with one side thereof extending rearwardly as in FIG. 11 defining a channel 83 within which the leading edge of the side insert is received.

A frame 84 for a door or hatch is hinged to the cabin frame to provide access between the cabin and the after cockpit. As shown in FIG. 1, the rear portion of the cabin frame, including the door frame, is covered with the transparent material. Referring more particularly to FIG. 6, it will be seen that the door has a tapered configuration being formed wider at the top than at the bottom. The opening thus provided offers a passageway of optimum proportions for a limited area. The door, along with the side panes of the cabin, is inclined to a certain extent so that rain and spray will run off the cabin out over the side or aft out through the cockpit. It will be understood that when it is closed, the upper edge of the door will be under the flange 74, effectively sealing that area against the elements.

Referring again to FIG. 7, an upright brace 86 is secured to a transverse rib 24 and at the lower edge of the cabin frame so that the cabin frame and hull will be rigidly connected to one another. By mounting the cabin frame to the hull in the fashion described, the overall strength and rigidity of the hull is increased with a relatively small increase in weight. Angle stock, tubular or flat pieces may be embodied to good advantage for the frame members and may be fabricated from aluminum, magnesium, steel or other suitable material.

Within the cabin an upright H beam 88 extends from the hull bottom to the overhead and joins the cabin frame by the upper section of a brace 90, suitably bent to fit against the roof 62 and the windshield 68, which extends downward to the hull bottom where it is mounted on top of a longitudinal rib 24. Primarily, the beam 88 and brace 90 serve as a reinforcing support for the mast which will be described in detail below. As a secondary function, the beam and brace support hinged panels which enclose a compact lavatory, including a chemical commode 92 and a sink 94. The enclosure for the lavatory includes a fixed longitudinal panel 96 with a hinged upper section 98. A longitudinally split door 98 is hinged to the upright 88 and is formed with a triangular bottom section 100 which closes against the base of the sink cabinet. A small triangular panel 102 is mounted over the sink cabinet and a fixed forward bulkhead 104 completes the enclosure. When not in use, the several hinged panels may be folded out of the way to provide more convenient access to the sink and improve visibility from within the cabin.

The cabin is also furnished with built-in storage chests 106 which double as benches and also provide structures that rigidly locate the sides 12, the steps 22, the decks 26, the cabin frame 50 and the channel 110. A peak tank 108 is installed in the bow and may be used for potable water or ballast.

Referring now more particularly to FIG. 12, it will be seen that on either side of the hull at the bottom there is a V-channel 110 located approximately at or slightly aft of the center of gravity. Preferably, the channel is of V cross section although a recess of semicircular or rectangular cross section may also be used to advantage. The function of the channel is to receive, alternatively, a strut 112 for a wheel and tire assembly 114 when the hull is being towed along the road, as suggested in FIG. 3, or to mount leeboards 116 such as those shown in FIG. 2, when the craft is under sail. When operating under power alone, as in FIG. 4, the channel may be used to mount hydrofoils (not shown) or may be filled with plugs 118 of triangular cross section to present a smooth unbroken outer surface.

The leeboard connection with struts and plugs are all formed with cross sections to mate snugly with the channels and are secured in place by means of a bolt 120. The shank of the bolt passes through the wheel strut, for example, and is threaded into a tapped sleeve 112 mounted at one end of the frame of the chests 106 and at its other end within a socket 114 formed on the inner side of the hull directly inboard of the channel 110. Alternatively, a boss 116 (FIG. 12a) may be fashioned integral with the hull and fitted with a tapped sleeve 118, suitably locked in place as by a pin 120. The upper end of the strut 112 may bear against a shoulder 111 that terminates the channel 110. Thus, when the wheels are in place, the bolt remains in tension only, the shoulder 111 taking up the vertical load.

The mounting arrangement for the wheels and leeboards which has been described above has two immediate advantages. First of all, the joint is of simple reliable design, that is inexpensive to manufacture and permits quick and convenient mounting and de-mounting of the several attachments. Secondly, the recessed design permits the hull to have a beam of maximum width as permitted by applicable state law. All states have a maximum limit of 8′ on the overall width for vehicles passing over their highways. By providing a recess for the wheel struts and mounting the wheels to face inboard (FIG. 5), the hull may have a beam width of a full 8′ and, when converted to a trailer, will have no illegally projecting parts. As an additional somewhat less obvious advantage, standard 4 x 8 sheet stock may be used in a substantial part of the hull when it is fabricated from sheet material such as plywood or the like.

When the craft is to serve as a trailer, the wheels are mounted in the manner described and a hitch 122 (FIG. 3) is bolted at one end into a V-channel 124 (FIG. 1), located at the center of the bow in the foredeck 16, and at the other end to the towing vehicle. The joint for the trailer hitch is similar to that used to mount the wheels, in that the hitch is of angle stock adapted to mount snugly into the V-channel.

In view of the fact that the craft is intended to function both as a sailboat, motorboat, and trailer, it is desirable that it be adapted for quick and convenient conversion from one use to another. To this end, the craft has been provided with a mast 126 which may be readily stepped or unstepped by a single person.

Figure 20:
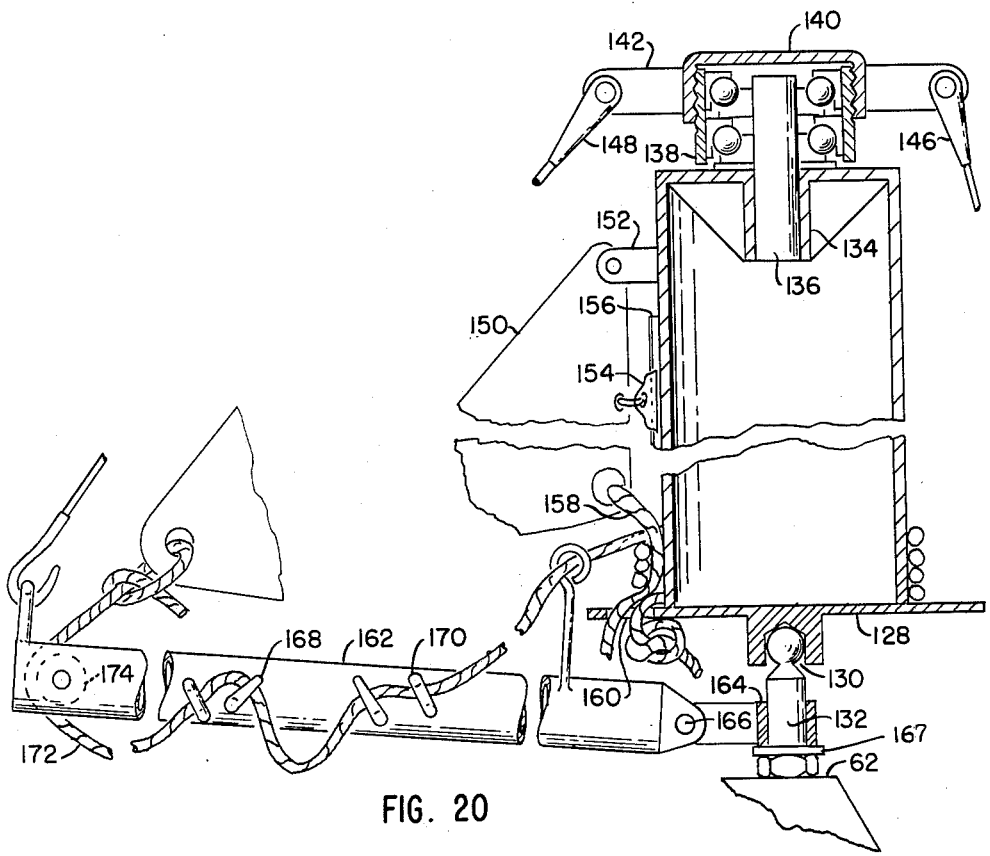
FIG. 20 is a fragmentary side elevation partly in section showing the mast, boom and associated rigging.

Referring more particularly to FIGS. 19 and 20, the mast 126 is shown as having a tubular body closed at its lower end by a circular plate 128 having a diameter somewhat greater than that of the mast. A socket 130 is formed centrally on the underside of the plate, and is seated over the bolted top of a vertical post 132. The post is permanently mounted on the cabin roof which is reinforced below by the structural members 88 and 90. At the upper end of the mast an annular support 134 carries a fixed axial shaft 136 which extends into rotatable engagement with a bearing assembly 138. The bearing assembly is suitably protected by a cap 140 having radial arms 142 which serve to engage side-stays 144, a head stay 146 and a topping lift 148.

It will be appreciated that the mast being mounted in the manner described is rotatable about its longitudinal axis and that a sail 150 secured to the mast may be conveniently stored by rotating the mast until the sail is completely furled about it. The peak of the sail is secured to the mast by a fixed support 152 and the luff, being provided with slides 54, engages a track 156 secured lengthwise along the mast. The tack may be secured to the plate 128 by a line 158 passed through an opening 160 formed in the plate. A tubular boom 162 engages the post 132 by means of a neck 164 which permits the boom to swing about the post in a horizontal plane. The boom is also provided with a pivot 166 permitting movement in a vertical plane. A rubber washer 167 is mounted over the post and beneath the neck to cushion the neck and prevent undue wearing of the parts.

The boom is provided with jamb cleats 168 and fairleads 172 to control a clew outhaul 172 which is fastened at one end to the clew and has its opposite end passed around the base of the mast over the plate 128 and secured through the opening formed near the clew end of the boom to accommodate the clew outhaul.

It will now be understood that the sail may be fully set, furled, or reefed by pulling the clew outhaul 172 fore or aft as required. The mast 126 will rotate about the post 132 and the sail will be carried along the boom. Once the position of the sail is established, the clew outhaul may be secured by the jamb cleats 168. By using a rotatable mast to store the sail, very little exertion is required to set it in contrast with conventional riggings where the sail must be hauled up the mast. If the sail 150 is made of a synthetic fabric, such as dacron for example, there is no danger of the sail rotting while furled about the mast, even for extended periods.

While the invention has been described with particular reference to the illustrated embodiment, it will be understood that this embodiment is given by example only and that a number of modifications may be made without departing from the spirit and scope of the appended claims.

Having thus described my invention, what I claim and desire to obtain by Letters Patent of the United States is:

1. A combination boat and automobile trailer, comprising a rigid keelless hull of molded fiberglass said hull being formed with substantially flat vertical sides arranged parallel to one another, a generally flat rectangular foredeck extending between the upper forward edges of said sides and being inclined downwardly, said hull also including a generally rectangular longitudinally stepped bottom having an upwardly curved forward portion and a straight leading edge joining with the leading edge of said foredeck to form the bow of said hull, internal ribs extending transversely of said bottom, each side of said hull being formed with an external channel of V-cross section located generally along the longitudinal balance position of said hull and extending vertically upwards from the lower edge of each of said sides, elongated struts of V-cross section adapted to be mounted snugly within said channels, said struts selectively being supports for wheels when said hull is used as a trailer and being supports for leeboards when said hull is used as a boat.

2. A combination boat and automobile trailer, comprising a rigid, keelless hull of molded fiberglass, said hull being formed with substantially flat vertical sides arranged parallel to one another, a generally flat rectangular foredeck extending between the upper forward edges of said sides and being inclined downwardly, said hull also including a generally rectangular longitudinally stepped bottom having an upwardly curved forward portion and a straight leading edge joining with the leading edge of said foredeck to form the bow of said hull, internal ribs extending transversely of said bottom, each side of said hull being formed with an external channel of V-cross section located generally along the longitudinal balance position of said hull and extending vertically upwards from the lower edge of each of said sides, elongated struts of V-cross section adapted to be mounted snugly within said channels, said struts selectively being supports for wheels when said hull is used as a trailer and being supports for leeboards when said hull is used as a boat and a rigid skeletal frame mounted within the mid-portion of said hull and defining a cabin therewith, said frame being secured to said hull to form a stiff integrated structure, said frame also providing a base support for a sail mast mountable on said cabin.

3. A combination boat and automobile trailer, comprising a rigid, keelless hull of molded fiberglass, said hull being formed with substantially flat vertical sides arranged parallel to one another, a generally flat rectangular foredeck extending between the upper forward edges of said sides and being inclined downwardly, said hull also including a generally rectangular longitudinally stepped bottom and having an upwardly curved forward portion and a straight leading edge joining with the leading edge of said foredeck to form the bow of said hull, internal ribs extending transversely of said bottom, each side of said hull being formed with an external channel of V-cross section located generally along the longitudinal balance position of said hull and extending vertically upwards from the lower edge of each of said sides, elongated struts of V-cross section adapted to be mounted snugly within said channel, and wheels rotatably mounted on said struts, said struts together with said wheels being mounted in said channels when said hull is used as a trailer, said wheels being mounted on the inboard side of said struts.

4. A combination boat and automobile trailer comprising a hull having generally flat vertical sides, an outwardly facing channel member of V-cross-section mounted generally vertically in each side of said hull, each of said members having its outer edges flush with the outer surface of said sides, a tapped boss fixed inboard of said member and extending in a generally thwartships direction, an elongated strut of V-cross section mountable lengthwise in each channel member, each of said struts being provided at its inboard lower end with a wheel rotatably mounted thereto for supporting said hull when in use as a trailer, said strut being secured to said channel member by means of a bolt passing through said strut and threaded to said boss.

References Cited in the file of this patent

UNITED STATES PATENTS

| | | |
|---|---|---|
| 1,492,827 | Begas | May 6, 1924 |
| 2,107,303 | Ljungstrom | Feb. 8, 1938 |
| 2,280,729 | Sutton | Apr. 21, 1942 |
| 2,370,508 | Wilkie | Feb. 27, 1945 |
| 2,509,974 | Jacobs | May 30, 1950 |
| 2,720,662 | O'Bannon | Oct. 18, 1955 |
| 2,744,267 | Roby | May 8, 1956 |